E. ZONA.
PROTRACTOR.
APPLICATION FILED MAR. 24, 1916.

1,245,304.

Patented Nov. 6, 1917.
2 SHEETS—SHEET 1.

E. ZONA.
PROTRACTOR.
APPLICATION FILED MAR. 24, 1916.

1,245,304.

Patented Nov. 6, 1917.
2 SHEETS—SHEET 2.

Ezia Zona, Inventor
By his Attorney
Frank Locker

UNITED STATES PATENT OFFICE.

EZIO ZONA, OF NEW YORK, N. Y.

PROTRACTOR.

1,245,304.  Specification of Letters Patent.  Patented Nov. 6, 1917.

Application filed March 24, 1916. Serial No. 86,449.

*To all whom it may concern:*

Be it known that I, EZIO ZONA, a subject of the Kingdom of Italy, residing at 64–66 Spring street, in the borough of Manhattan, county and State of New York, have invented a new and useful Protractor, of which the following is a specification, reference being had to the accompanying drawing, forming part thereof.

This invention relates to providing convenient means for plotting Sumner lines by the method of St. Hilaire, and for the determination of a "fix" from intersecting altitude lines.

As will be clear to those familiar with the science of navigation, the Sumner method of determining graphically the position of a ship at sea depends essentially on observations of the altitude and hour angle of a celestial body made usually by means of a sextant and chronometer. The altitude of a celestial body having been determined, its zenith distance can readily be computed, while from the observed hour angle the azimuth of the observed body from the meridian may be determined. It will be remembered that the Sumner line is at right angles to the true bearing of the observed celestial body and according to the method of St. Hilaire may be plotted with reference to the assumed geographical position of the observer by laying off in the direction of the azimuth of the observed celestial body, a distance equal to the zenith distance or altitude difference.

The main object, therefore, of this invention is to provide convenient drafting means for plotting the altitude differences and azimuths of the observed celestial bodies.

Other objects and advantages of this invention will appear from the description and the particular features of novelty will be pointed out in the claims.

Figure 1:
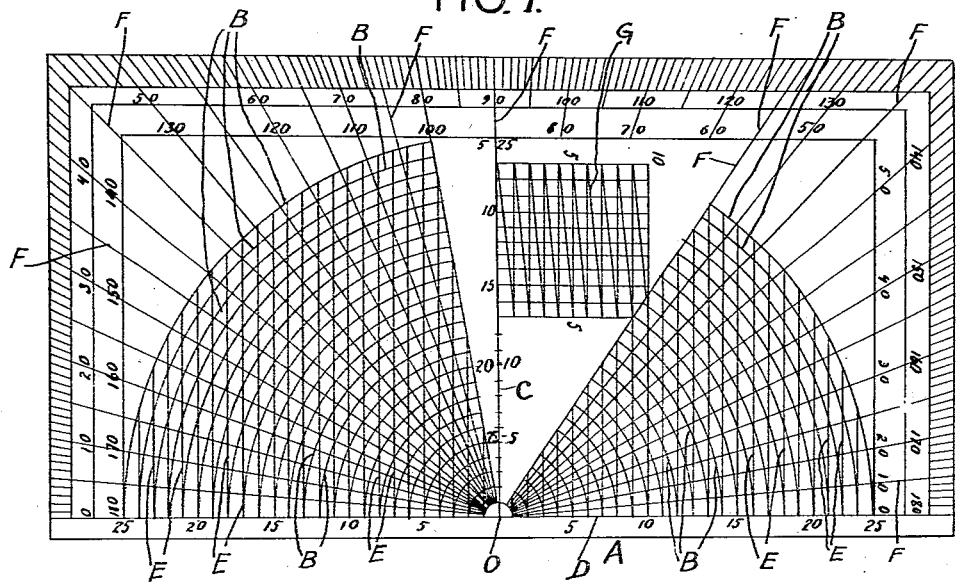
Figure 2:
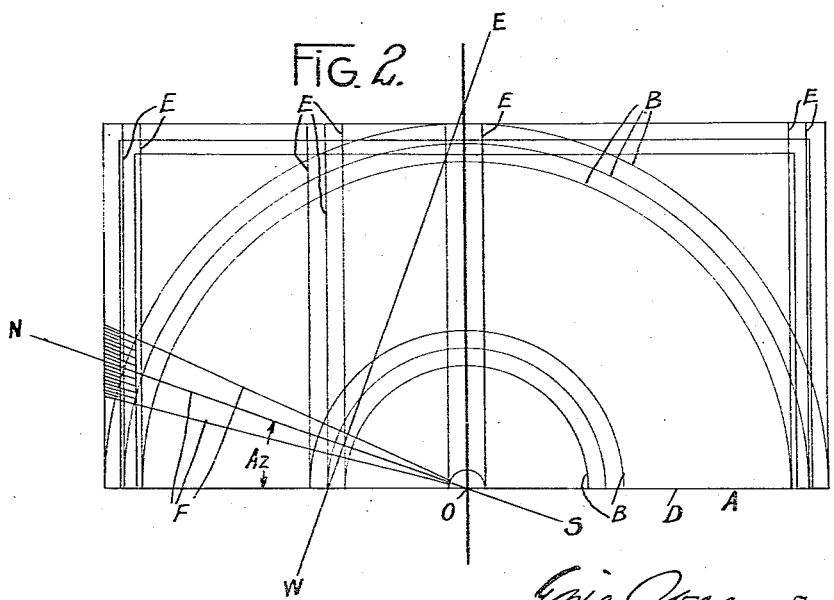
Figure 3:
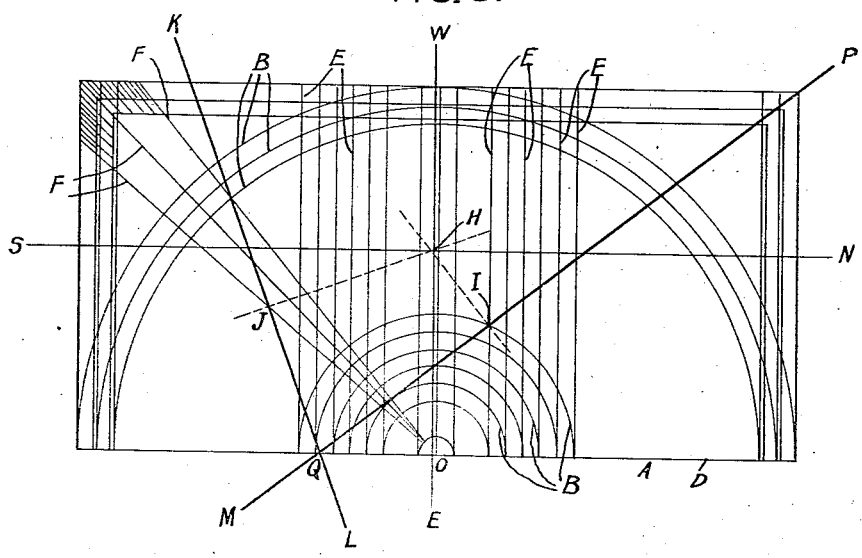
Figure 4:
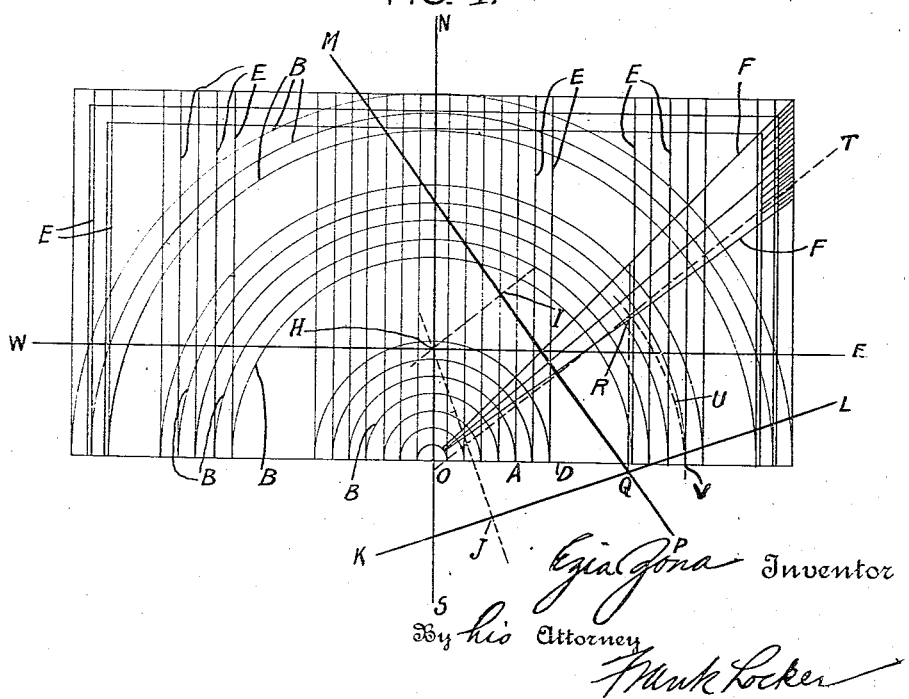

In the accompanying drawings, forming part of this specification, Figure 1 shows a protractor which is an embodiment of my invention. Figs. 2 to 4, inclusive, are diagrammatic drawings, (all of the lines and semi-circles and indicators not being fully shown), to aid in the explanation of the various uses of the protractor.

To attain my object, I provide a protractor, having scales and lines thereon, arranged and marked so as to facilitate the nautical plotting of the character hereinbefore described.

Referring particularly to the drawings, the protractor consists of a body A, preferably rectangular and transparent, one plane of which is provided with a series of equidistant concentric semi-circles BB—B whose common distance apart is one minute of latitude or one mile of distance run. Numerals, such as 5, 10, 15, etc., are applied to the intersection of the semi-circumferences with the vertical radius C to indicate the corresponding minutes of latitude.

From the intersections of the semi-circumferences with the diameter D of the protractor, perpendiculars EE—E are drawn parallel to the shorter sides of the rectangle and limited to the largest circumference. Numerals, such as 5, 10, 15, etc., are applied at the intersections of the semi-circumference with the diameter D of the protractor to either side of the mid-point O thereof to aid in plotting positive or negative altitude differences as hereinafter explained.

Three sides of the rectangle are subdivided as an ordinary protractor giving the angular intervals between the radii FF—F drawn from the center of the semi-circles, and numerals are provided to read the number of degrees of circular arc and supplements thereof as in the ordinary protractor for measuring angles.

To help in estimating more accurately fractions of a minute of latitude, I provide an extra scale G to read preferably to one-tenth of a minute of latitude.

The method of plotting a Sumner line with my newly invented protractor will now be described, reference being had particularly to Fig. 2 of the accompanying drawings.

In accordance with the method of St. Hilaire the Sumner line is found by laying off from the assumed geographical position along the line of direction, in which the observed celestial body bore, the determined distance to the Sumner line. This may be done by means of my protractor, as follows: Having drawn two lines N S and W E at right angles to each other, to represent respectively the meridian of longitude and parallel of latitude, through the assumed position of the observer, on the sheet on which the Sumner line is to be plotted, lay the protractor over the paper, placing in coincidence with the meridian N S that radius of the protractor whose angular distance from the diameter D is equal to the azimuth Az of the celestial body from the meridian, and with the center O of the protractor removed from the assumed position of the observer by a distance marked off on the radius by its intersection with the ordinate perpendicular to D whose distance from O as marked off on D is equal to the altitude difference, the determined distance from the assumed geographical position to the Sumner line. The diameter D of the protractor is now in the direction of the azimuth of the observed celestial body and consequently the vertical lines EE—E are now all parallel to the direction of the Sumner line. The particular Sumner line in question can now be readily drawn by marking the ends of the ordinate through O.

To determine the fix of the ship with reference to the assumed position of the observer, two such Sumner lines, based on observations of two celestial bodies, may be plotted according to the method already described, and the fix determined by their point of intersection. This is shown clearly in Fig. 3 of the drawing in which H I and H J are respectively the directions of the observed celestial bodies, and M P and K L their corresponding Sumner lines. Their intersection Q gives the position of the ship relative to the assumed geographical position H.

To absolutely determine the position of the ship, it now remains to obtain the latitude and longitude of the point Q, the latitude and longitude of the point H being, of course, given by the observations of the sextant and chronometer.

To find the difference of latitude we may proceed preferably as follows, reference being had particularly to Fig. 3. Place the protractor on the chart with its center O on the parallel of latitude W E while the semi-diameter D passes through the point Q, in a direction at right angles to W. E. In other words, the 90 degree radius C coincides with the parallel of latitude of the assumed geographical position H. The number of divisions of D, counted between Q and W. E., will give the latitude difference expressed in minutes.

The difference of longitude of the point Q may now be determined, preferably as follows, reference being had particularly to Fig. 4 of the accompanying drawings. Place the protractor upon the chart so that the radius C coincides with the meridian N. S. and the semi-diameter D passes through the point of intersection Q of the two plotted Sumner lines. The number of divisions of D between N. S. and Q will then give the departure expressed in nautical miles, while the corresponding difference in longitude may be easily found by following the perpendicular to D at Q to its point of intersection R with that radius T which makes an angle with D equal to the middle latitude, and then following the circumference U that passes through this point of intersection R to its (circumference's) intersection V with the scale on D.

The number of divisions of this scale between the point V thus reached and the center O gives the difference in longitude in minutes of arc.

Having thus described my invention, what I claim as new, and desire to secure by Letters Patent is:

1. A device employed in the plotting of the position of a ship comprising a body, a plane of which is provided with a plurality of equally spaced concentric semi-circles, a plurality of angularly equi-distant radial lines, terminating in the largest semi-circumference, and a plurality of equally spaced vertical lines cutting the semi-circles and radial lines.

2. A device employed in the plotting of the position of a ship comprising a body, a plane of which is provided with a large semi-circle, a series of equi-distant semi-circles concentric therewith, whose common distance apart represents one degree of latitude or one mile of run, a plurality of angularly equi-distant radial lines whose common angular distance apart is some convenient part of the semi-circle and a plurality of equi-distant vertical lines drawn from the points of intersection of the semi-circumference with the diameter of the semi-circle, and terminating in said semi-circle.

3. A protractor for plotting the position of a ship from the observations of the altitude and hour angle of celestial bodies, having a scale thereon, adapted to plot zenith distances, comprising a series of equi-distant concentric semi-circles, and a scale adapted to plot azimuths, said scale comprising a series of angularly equi-distant radial lines and cutting the latter, radiating from the common center of the semi-circles, and a series of vertical lines cutting said semi-circles and adapted to be arranged parallel to the direction of the line on which the point of position of the ship lies, when the diameter of the protractor lies in the direction of the azimuth of the celestal body.

4. A protractor for plotting the position of a ship from observations of the altitude and hour angle of celestial bodies, having a scale thereon adapted to plot zenith distances comprising a series of equi-distant concentric semi-circles whose common distance apart represents some convenient number of degrees of latitude or miles of run or a convenient fraction thereof and a scale adapted to plot azimuths, said scale comprising a series of angularly equi-distant radial lines, whose common angular distances apart is equal to some convenient part of the semi-circular arc, and a plurality of equi-distant vertical lines, drawn from the intersections of the semi-circles with the diameter of the protractor, and cutting the latter and adapted to be arranged parallel to the line in which the point of position of the ship lies when the diameter of the protractor lies in the direction of the azimuth of the particular celestial body.

5. A protractor for plotting the position of a ship from observations of the altitude and hour angle of celestial bodies, having a scale thereon adapted to plot zenith distances comprising a series of equi-distant concentric semi-circles whose common distance apart is equal to some convenient part of the semi-circular arc, and a plurality of equi-distant vertical lines drawn from the intersections of the semi-circumferences with the diameter of the protractor, and adapted to be arranged parallel to the line in which the point of position of the ship lies when the diameter of the protractor lies in the direction of the azimuth of the particular celestial body, and a scale reading to one-tenth of one minute of latitude to facilitate the estimating of latitudes from the plots made with said protractor.

6. A protractor employed in the plotting of the position of the ship comprising a transparent rectangular body, a plane of which is provided with a series of equi-distant concentric semi-circles, numerals applied at the intersections of the semi-circles with the vertical radius, a plurality of angular equi-distant radial lines crossing said semi-circles and terminating in three sides of the rectangle, and numerals applied to the points of intersection of these radial lines with the three sides of the rectangle, a plurality of equally spaced vertical lines drawn from the points of intersection of the semi-circumferences with the diameter of the protractor and terminating in the largest semi-circumference, numerals applied at the points of intersection of these vertical lines with the diameter of the protractor increasing in value to either side of the mid-point thereof, and a scale to facilitate the more precise determination of latitudes from the plots made with said protractor.

7. A device employed in the plotting of the position of a ship comprising a body, a plane of which is provided with a plurality of equally spaced concentric semi-circles of latitude, indicators, such as numerals applied thereto, to read the degrees of latitude, a plurality of angularly equi-distant radial azimuth lines cutting the semi-circumferences, suitable indicators such as numerals applied thereto to read the degrees of azimuth, and a plurality of equally spaced vertical altitude lines cutting the semi-circles, and appropriate indicators applied to these lines to read altitude differences.

8. A device for plotting Sumner lines from observations of the latitude and hour angle of a celestial body, comprising a protractor adapted to facilitate the plotting of these astronomical observations comprising a body, a plane of which is provided with a scale of altitudes comprising a series of equi-distant concentric semi-circles, and a scale of azimuths comprising a series of angularly equi-distant radial lines, and a series of vertical lines cutting said semi-circles and adapted to be arranged parallel to the direction of the particular Sumner line corresponding to the said astronomical observations when the diameter of the protractor lies in the direction of the azimuth of the observed celestial body.

9. A device for plotting Sumner lines from observations of the latitude and hour angle all of a celestial body made respectively with a sextant and a chronometer, comprising a protractor adapted to facilitate the plotting of the altitude difference and azimuth observations made on a celestial body with said sextant and chronometer, said protractor being provided with a scale of altitudes comprising a series of equi-distant concentric semi-circles, and a scale of azimuths comprising a series of angular equi-distant radial lines, and a series of vertical lines cutting said semi-circles and adapted to be arranged parallel to the direction of the particular Sumner line corresponding to the said astronomical observations when the diameter of the protractor lies in the direction of the azimuth of the observed celestial body.

EZIO ZONA.

Witnesses:
GAETANO ZAMPARILLO,
HUMBERT A. VANNOZZI.